United States Patent Office 2,901,474
Patented Aug. 25, 1959

2,901,474

PROCESS FOR THE PRODUCTION OF HIGH MOLECULAR EARTH ALKALI METAL COMPLEX COMPOUNDS

Robert Pulver, Basel, Switzerland, assignor to Geigy Chemical Corporation, New York, N.Y., a corporation of Delaware No Drawing. Application February 28, 1957
Serial No. 642,946

Claims priority, application Switzerland March 5, 1956

7 Claims. (Cl. 260—209.5)

The present invention concerns a process for the production of high molecular earth-alkali metal complex compounds which have valuable therapeutic properties, in particular a retarding action on the coagulation of the blood.

After parenteral application, heparin has a direct action on single factors in blood coagulation whilst anticoagulants of the hydroxycoumarin and indandione derivative type which are to be administered per os only have an indirect influence after a latent time from one to more days on the coagulation of the blood. These latter compounds inhibit the formation of coagulation factors in the liver. Whilst the latter group of anticoagulants are excellently suitable in prophylaxis or therapy for maintaining a hyprothrombinemic status, heparin is of great importance in bridging the latent time of the indirectly acting anticoagulants and, in particular, in the immediate treatment of thromboembolitic complications. Thus, there have been many attempts to replace heparin, which can only be obtained from the lungs or liver of slaughtered animals and is, therefore, limited in amount and also costly, by alkali salts of acid polysulphuric acid esters of polysaccharides of similar structure and which are more easily produced, but up to now this has not been done in a satisfactory manner.

Surprisingly it has now been found that high molecular earth-alkali metal complex compounds which are highly active anticoagulants and can be injected with good tolerance, are obtained if pectin is reacted in aqueous solution with hydrogen peroxide in a concentration of 1–5% and in an amount of 20–100%, calculated on the dry weight of the pectin, the reaction of the solution being neutral to weakly acid, until the desired degree of decomposition, which is determined by measuring the viscosity, is attained. The decomposition products are then precipitated, advantageously in fractions, by the addition of water soluble organic solvents, isolated, dried and then converted by means of chlorosulphonic acid in formamide or in pyridine, into acid polysulphuric acid esters. These latter, after neutralising with a non-precipitating base are reacted in aqueous solution while keeping the reaction in the region of neutral, with an ionising earth-alkali metal salt, in particular a calcium salt, and then, if desired, the earth-alkali metal complex compound is precipitated with a water soluble organic solvent.

The first step of the oxidative decomposition of pectin in the process according to the present invention, the reaction with hydrogen peroxide, is performed advantageously in the presence of at least 1% of an organic substance, calculated on the whole aqueous reaction solution, which is soluble at least in this concentration in water as well as in diethyl ether and has pectin precipitating properties in higher concentrations insofar as these are attainable in water, or it is performed in the presence of mixtures of such substances.

Advantageously 2–10% aqueous solutions of pectin are used. The reaction temperature can be between 25° and 100° C. and, if pressure vessels are used, can be still higher, but the moderately high temperatures between 50 and 80° C. have proved to be particularly favourable. By neutral to weakly acid reaction, in particular pH values of 5–6 are meant; what is important is that during the decomposition, the pH value should not sink considerably below 5. This can be prevented for example by buffering with sodium acetate. The decomposition reaction can last from some minutes to some days depending on the temperature used and the other reaction conditions. It is performed advantageously up to a relative viscosity of 1.3–3.0 centipoise at 75° and 5% concentration.

The organic substances defined above which are added in the decomposition reaction in amounts of at least 1%, cause a considerable reduction in the rapidity of the reaction which can be determined by the retardation of the diminution in viscosity. In the presence of these organic substances, the oxidative decomposition can be more easily guided and produces improved yields of decomposition products of more uniform quality.

The organic substances as defined more strongly retard the oxidative decomposition of pectin than that of a part of the unavoidable undesirable accompanying substances so that the latter, because of their quicker and more complete decomposition, are not precipitated with methanol and similar solvents. On the other hand, unchanged high molecular accompanying substances can be precipitated together with those parts of the decomposition products which have the highest molecular weight. Both are precipitated as the first fraction which can be discarded. In particular such organic substances are suitable as additives which can be easily removed after the reaction. They should be therefore, easily volatile and/or easily soluble in the mixtures of water and water soluble organic solvents used in the precipitation of the decomposition products. Examples are alcohols such as methanol, ethanol, n-propanol and n-butanol; oxo compounds such as acetone, propanone and acetaldehyde; also glycols such as ethylene glycol; esters, ethers and similar substances such as ethyl acetate, butyrolactone, diethyl ether, methoxy ethanol and dioxan. In particular methanol, ethanol or acetone are suitable as water soluble solvents for the precipitation of the pectin decomposition products, which precipitation is advantageously done in fractions. The products obtained by oxidative decomposition according to the present invention are undoubtedly chemically different from the products obtained by enzymatic decomposition or acid hydrolysis, as it is only from the first-named that sulphation products are obtained which are capable of binding calcium or other earth-alkali metals such as strontium, in complex linkage at a neutral or almost neutral reaction. However, also the decomposition products themselves form metal complexes; apart from calcium complexes, e.g. also iron, copper and cobalt complexes, the aqueous solutions thereof can be used therapeutically.

The oxidative splitting of the pectin chains can be explained by the introduction of a hydroxyl group into the 1-position of a part of the galacturonic acid or galacturonic acid methyl ester unit, followed by the splitting of the corresponding glycosidic linkages. Glycosidic linkages also become similarly instable on the introduction of a hydroxyl group into the 4-position of galacturonic acid or galacturonic acid methyl ester units and, to an increasing degree, on the simultaneous introduction of a hydroxyl group into each of the 1- and 4-positions of two neighbouring uronic acid units. The formation of complexes with earth alkali metals and heavy metals is due to α-hydroxycarbonyl groupings such as result from oxidative reactions as mentioned above. Naturally, as the molecular weight decreases, the number of end groups capable of forming complexes increases. As the complexes have not only double but ten to twenty times the molecular weight of the starting material, it is supposed that there are at least two complex forming atom groupings in each molecule of the oxidative decomposition products. These are probably in the end members.

Pectin decomposition products according to the present invention which on sulphation and subsequent formation of calcium complexes, produce highly active, non-toxic anticoagulants, have a molecular weight of preferably about 1000–3000, corresponding to 5–15 uronic acid units. If such decomposition products are reacted with sufficient amounts of salts of complex forming metals, e.g. with calcium salts, the molecular weight rises up to from 10 to 20 times the original, which can be explained by the union of up to 20 low molecular chains over the complex linkages. Similar increases in molecular weight, determined by decrease in the osmotic pressure, also occur on reacting the sulphation products according to the present invention with salts of complex forming metals. End products, i.e. calcium complexes of polysulphuric acid esters which have many times the molecular weight of the relatively low molecular starting products, are produced in this way from pectin decomposition products. These end products have similar activity to heparin. In contrast to the above, by sulphation of pectin decomposition products of the same molecule size but which are produced in another manner, polysulphuric acid esters are obtained which, although they are non-toxic, do not have an action similar to heparin because of their too slight molecular weight.

The oxidatively decomposed pectins can be sulphated analogously to the sulphation of pectin or of pectins partially decomposed by means of pectinase, for example with chlorosulphonic acid in formamide. According to this process, a mixture of chlorosulphonic acid and formamide is reacted at a temperature between 10° and 40° C. with the pectin decomposition product, possibly after this has been dissolved or suspended in formamide. Preferably 2.5–5 parts by weight of chlorosulphonic acid and, in all, 6–14 parts by weight of formamide are used to 1 part by weight of pectin decomposition product. Esterification occurs to a considerable extent while some formamide is converted into ammonium salts, the reaction products being obtained direct with a sulphur content of 12% and more. They are isolated in a simple manner, e.g. by pouring the reaction mixture into alcohol and filtering off the precipitate. The acid polysulphuric acid esters obtained are neutralised by reacting them for example with caustic soda lye, sodium carbonate or sodium bicarbonate in aqueous solution.

Also the sulphation with chlorosulphonic acid in pyridine can be used which has already been described for polygalacturonic acid methyl glycosides and polygalacturonic acid methyl ester methyl glycosides.

The earth-alkali metal complex compounds can be produced from the polysulphuric acid esters for example by dissolving these in a concentration of 5–30% in water at room temperature, neutralising the solution with caustic soda lye and adding a water soluble ionising earth-alkali metal salt, e.g. a calcium salt, such as calcium chloride, or a strontium salt, in a concentration of 0.5–10%. The complex forms very quickly and can be precipitated by the addition of e.g. methanol, ethanol or acetone. It is washed with the precipitating agent and dried. However, also sodium salts of the acid polysulphuric acid esters which have been isolated after sulphation can be dissolved in water and reacted with water soluble calcium salts. If a non-pyrogenous solution of an ionising water soluble calcium salt is used which is well tolerated by the patient, then, if desired, the calcium complex need not be isolated. In this case, the use of a small excess of polysulphuric acid ester is advantageous, i.e. the amount of calcium salt used should contain at least half up to about as many calcium ions as can be bound in all in the complex linkage by the polysulphuric acid ester. This is the case, for example, if about 24–40% of non-pyrogenous calcium gluconate, calculated on the sodium salt of the acid polysulphuric acid ester, are added in aqueous solution. The reaction mixture so obtained can then be used direct for therapeutical purposes. Because of the complex formation, the relatively low molecular polygalacturonic acid methyl ester polysulphuric acid ester molecules form higher molecular, very active compounds, while any accompanying substances present remain low molecular and are, therefore, non-toxic.

The formation of calcium complex compounds in the reaction of pectin decomposed according to the present invention and polysulphuric acid esters produced therefrom with water soluble calcium salts can be traced, for example, in the following way. Rising amounts of 10% aqueous neutral solutions of pectin decomposed according to the present invention (Table I) or of neutral solutions of the sodium salt of a polysulphuric acid ester obtained therefrom of the same concentration (Table II) are each added to 2 ccm. of a 0.4% aqueous calcium chloride solution having a pH value of 7.0: 2 ccm. $\frac{1}{15}$ M-Sörensen phosphate buffer of pH 7.0 are then added to each test tube and the formation of calcium phosphate precipitates is observed. The results of tests with pectin of the same viscosity which has been decomposed with pectinase are shown by Table III.

TABLE I

| Test No. | 1 | 2 | 3 | 4 | 5 | 6 |
|---|---|---|---|---|---|---|
| Pectin decomposed with $H_2O_2$, ccm. 10% solution | — | 0.2 | 0.4 | 0.6 | 0.8 | 1 |
| Calcium phosphate precipitate | +++ | ++ | + | ± | — | — |

TABLE II

| Test No. | 7 | 8 | 9 | 10 | 11 | 12 |
|---|---|---|---|---|---|---|
| Polysulphuric acid ester, Na salt, ccm. 10% solution | — | 0.2 | 0.4 | 0.5 | 0.6 | 1 |
| Calcium phosphate precipitate | +++ | ++ | + | ± | — | — |

TABLE III

| Test No. | 13 | 14 | 15 | 16 |
|---|---|---|---|---|
| Pectin decomposed with pectinase, ccm. 10% solution | — | 1 | 2 | 4 |
| Calcium phosphate precipitate | +++ | +++ | +++ | +++ |

Test series I and II show that oxidatively decomposed pectin and the polysulphuric acid esters produced therefrom inhibit the formation of a phosphate precipitate provided they are used in sufficient quantity. This proves that, at least at pH 7, the calcium ions are bound in complex linkage. A clear inhibition and retardation of the calcium phosphate precipitation can already be observed in tests 3 and 9.

From test No. 11 it can be calculated that in the formation of the calcium complex, 60 mg. of the polysulphuric acid ester react with 8 mg. $CaCl_2$. If the ratio of 15:2 is altered in favour of the calcium chloride, then the solutions contain further calcium ions which can be precipitated with phosphate ions. Thus 0.133 part of calcium chloride or about 0.048 part of Ca ions such as are contained, for example, in 0.48 part of calcium gluconate, are necessary to saturate the complex valences of 1 part of the polysulphuric acid ester tested. As further tests showed, this ratio is independent of the concentration of the aqueous solutions of the reaction partner used in the reaction. It is, thus, a stoichiometric reaction.

The tolerance of the calcium complex compounds produced according to the present invention when applied to man is excellent whilst the polysulphuric acid esters from which they are derived cannot be used, for example in the form of their sodium salts, in the doses necessary for therapeutical purposes of about 400 mg. intravenously per day and more, in therapy because of the many side effects such as oedema of the wrist and dorsum of the foot, also tachycardia, paresthesia in the fingers, urticaria and vomiting. Other injectable anticoagulants having a direct action on blood coagulation cannot be improved with regard to their tolerance by the addition of calcium salts, such as e.g. calcium gluconate.

The following example further illustrates the performance of the reaction according to the present invention. Parts are given as parts by weight and their relationship to parts by volume is as that of grammes to cubic centimetres. The temperatures are in degrees centigrade.

*Example*

200 parts of pectin are mixed with 200 parts of sodium acetate, wetted with 400 parts by volume of ethanol and then 3600 parts of water are poured in. The whole is heated to 75°, 400 parts by volume of a 30% hydrogen peroxide solution are added and the reaction mixture is kept at this temperature for 2 hours while stirring. It is then cooled to 20°, 400 parts by volume of a 30% sodium chloride solution are added, then high molecular accompanying substances and high molecular decomposition products are precipitated by the addition of 2000 parts by volume of methanol and the precipitate is filtered off. After filtering, 2200 parts by volume of methanol are added to the filtrate, the precipitate is filtered off, washed with methanol and ether and dried in the vacuum. 85 parts of pectin decomposition product are thus obtained.

The sulphation is best performed in formamide with chlorosulphonic acid. 100 parts of the pectin decomposition product are added at 20° to a mixture of 1000 parts by volume (1135 parts) of formamide and 140 parts by volume (about 246 parts) of chlorosulphonic acid and the whole is stirred for 24 hours at this temperature. The acid polysulphuric acid ester can be isolated by pouring the reaction mixture into 6000 parts by volume of methanol and filtering. The product is again dissolved in water, neutralised with caustic soda lye and precipitated, after the addition of a little sodium chloride, with methanol. The sodium salt of the acid polysulphuric acid ester is then filtered off and washed with ethanol and ether. The yield is 130 parts.

The reaction to form the calcium complex can be done as follows:

(*a*) 10 parts of the sodium salt of the acid polysulphuric acid ester are dissolved with 1.3 parts of calcium chloride in 100 parts of water. 300 parts by volume of methanol are then added to the reaction mixture, it is filtered, the product is washed first with methanol and then with ether and dried in the vacuum. Yield=10.3 parts. Calcium content of the preparation=4.5%.

(*b*) 10 parts of the sodium salt of the acid polysulphuric acid ester are mixed with 4 parts of non-pyrogenous calcium gluconate and dissolved in water up to 100 parts by volume. The resulting solution is filled into ampoules and sterilised with stem.

What I claim is:

1. Process for the production of high molecular earth-alkali metal complex compounds comprising reacting pectin in aqueous solution with hydrogen peroxide in a concentration of at least 1% and at most 5% and in an amount of at least 20% and at most 100% calculated on the dry weight of the pectin, the reaction being performed at a neutral to weakly acid reaction of the solution until the desired degree of degradation is attained, then precipitating the higher molecular parts of the degradation products by the addition of a water soluble organic solvent, isolating and drying them and then converting by means of chlorosulphonic acid in a reaction medium selected from the group consisting of formamide and pyridine into acid polysulphuric acid esters, reacting the latter, after having neutralised with a non-precipitating base in aqueous solution and while maintaining at least an almost neutral reaction, with an ionising earth-alkali metal salt selected from the group consisting of calcium salts and strontium salts.

2. Process as claimed in claim 1 comprising performing the reaction with hydrogen peroxide in the presence of at least 1%, calculated on the total aqueous reaction solution, of an organic substance selected from the group consisting of alcohols, oxo compounds, glycols, esters and ethers and which is at least soluble in this concentration in water as well as in diethyl ether.

3. Process as claimed in claim 1 comprising reacting a mixture of chlorosulphonic acid and formamide at a temperature of between 10 and 40° with the pectin degradation product obtained according to the degradation steps claimed in claim 1, 2.5–5 parts by weight of chlorosulphonic acid and 6–14 parts by weight of formamide being used to 1 part by weight of pectin degradation product.

4. Process as claimed in claim 1, comprising reacting a sodium salt of an acid polysulphuric acid ester in aqueous solution at an almost neutral reaction, with a non-pyrogenous, water soluble, ionising calcium salt, the amount of calcium salt used containing at least half to about as many calcium ions as can be bound in complex linkage in the whole calcium complex.

5. Process as claimed in claim 1 wherein the ionising earth-alkali metal salt is calcium gluconate.

6. Process as claimed in claim 1 comprising the precipitation of the earth-alkali metal complex formed by adding a water soluble organic solvent and isolating the complex.

7. The high molecular earth-alkali metal complex compounds produced according to the process claimed in claim 1.

References Cited in the file of this patent

UNITED STATES PATENTS

| 2,132,577 | Olsen et al. | Oct. 11, 1938 |
| 2,599,564 | Lee et al. | June 10, 1952 |
| 2,729,633 | Alburn et al. | Jan. 3, 1956 |

OTHER REFERENCES

Deuel et al.: "Vierteljahrsschr. Naturforsch. Ges. Zurich," vol. 98 (1953), American Translation, pp. 17 to 19.